UNITED STATES PATENT OFFICE.

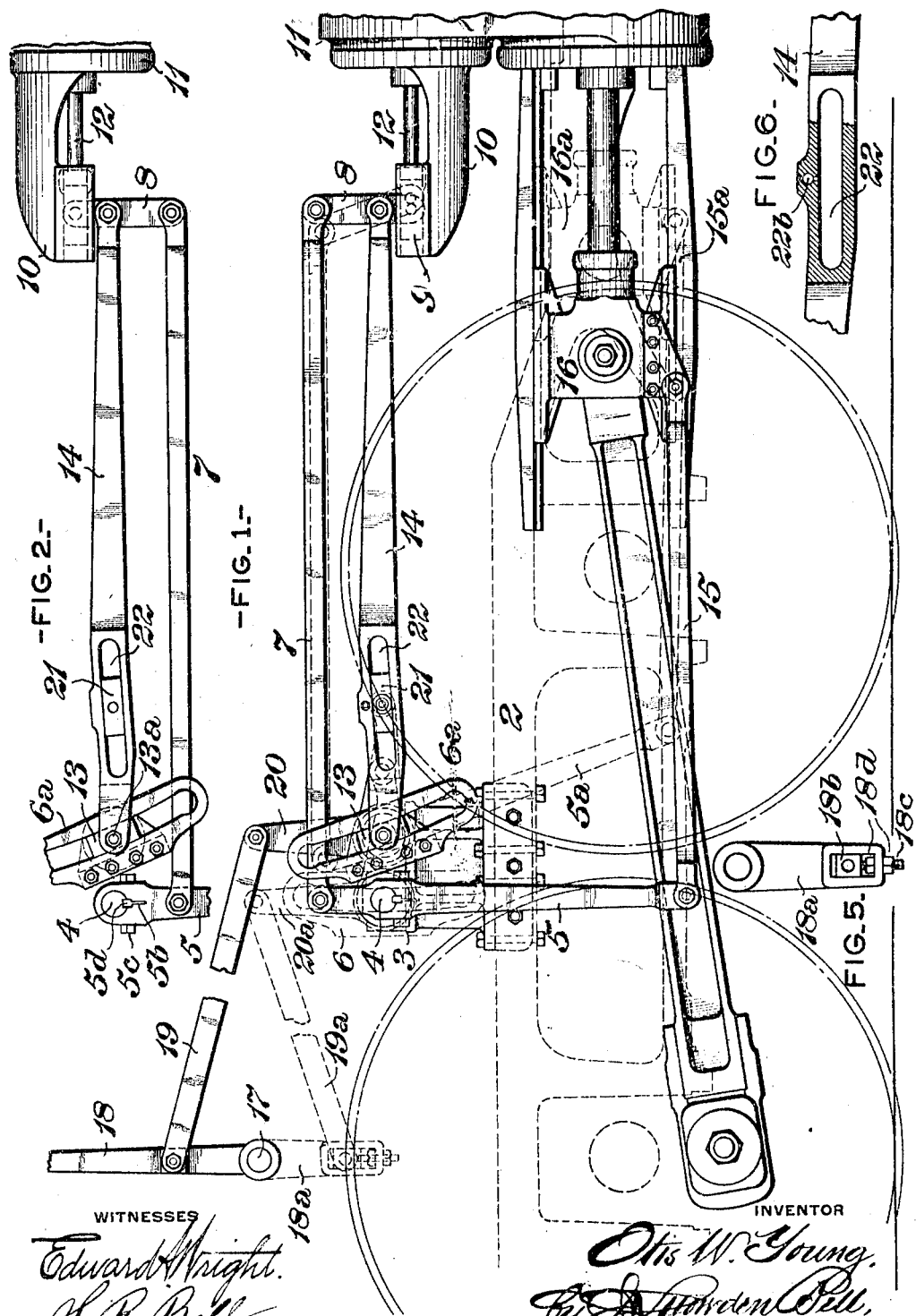

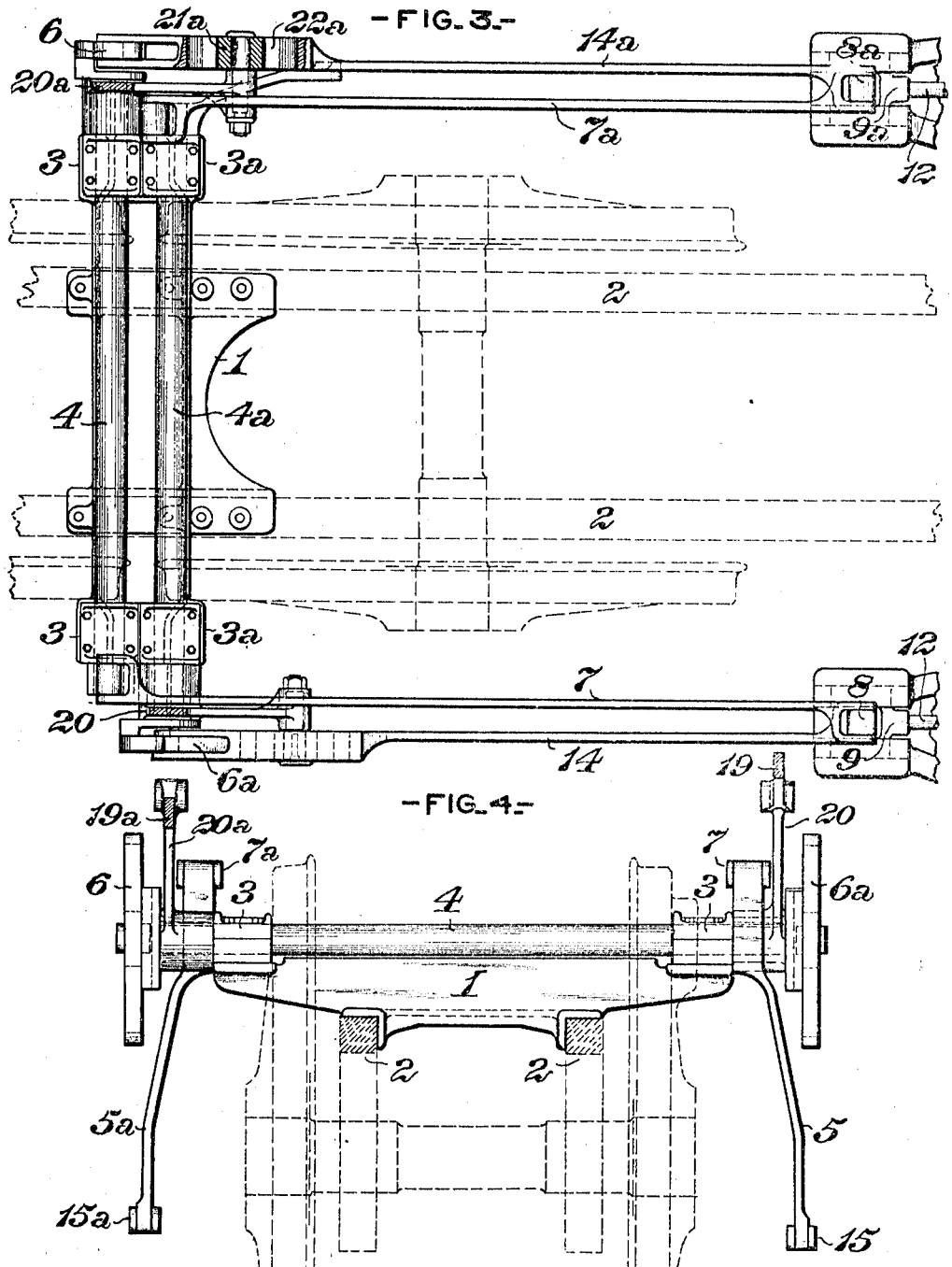

OTIS W. YOUNG, OF SCHENECTADY, NEW YORK.

STEAM-ENGINE VALVE-GEAR.

1,071,854.　　　　　Specification of Letters Patent.　　Patented Sept. 2, 1913.

Application filed April 2, 1913. Serial No. 758,351.

*To all whom it may concern:*

Be it known that I, OTIS W. YOUNG, of Schenectady, in the county of Schenectady and State of New York, have invented a certain new and useful Improvement in Steam-Engine Valve-Gear, of which improvement the following is a specification.

My improvement more particularly relates to locomotive engine valve gears of the so-called radial type, and its object is to provide a valve gear of such character which shall present the following practical advantages, viz: (a), simplicity of design and construction, by the embodiment of the fewest possible working parts, and interchangeability of details between engines of different classes, enabling the manufacturing cost of engines varying greatly in size and type, to be materially reduced; (b), the derivation of the motion of the gear wholly from the movements of the engine pistons, thereby eliminating the distortions resultant from the slip of driving boxes, wear of journal brasses, and settling of the engine upon its springs; (c), a self contained disposition and support of the working parts, and consequent avoidance of errors due to improper location of points of support, etc.; (d), capability of providing for longer valve travel than is practicable with ordinary valve gears; (e), simplification of the operations required in assembling the gear and setting the valves.

The improvement claimed is hereinafter fully set forth.

In the accompanying drawings: Figure 1 is a side view, in elevation, of a valve gear illustrating an embodiment of my invention, as applied for the operation of inside admission valves on a locomotive engine; Fig. 2, a similar view of a portion of the same, as applied for the operation of outside admission valves; Fig. 3, a plan or top view; Fig. 4, an end view; Fig. 5, a side view of the lower arm of the reverse shaft, detached; and Fig. 6, a partial longitudinal section through a radius bar.

In the practice of my invention, the movable members of the valve gear are mounted upon and carried by a support, 1, which is in the form of a cross tie or brace, bolted to the side frame members, 2, of the locomotive, and projecting outwardly therefrom, said support being provided, at its outer ends, with bearings, 3, 3ª, in which are journaled two parallel rock shafts, 4, 4ª, extending transversely above the frame members, in the same horizontal plane, and located a short distance, as, say, about eight inches, apart. An operating combination lever, 5, is fixed upon one end of one of the transverse rock shafts, as the rear shaft, 4, and a segmental slotted reversing and cut off varying link, 6, is fixed upon the opposite end of said shaft. A similar operating combination lever, 5ª, is fixed upon the end of the other shaft, 4ª, which adjoins the link, 6, and a link, 6ª, which is similar to, but of slightly shorter radius than, the link, 6, is fixed upon the end of said shaft which adjoins the combination lever, 5. The radius of each link, at its middle, is approximately equal to the length of the connected radius bar hereinafter described. The combination levers are split below their fits on the rock shafts, 4 and 4ª, by having longitudinal slots, 5ᵇ, cut in them, and are caused to grip the shafts by clamping bolts, 5ᶜ, until the key way is properly located, when they are secured on the shafts by keys, 5ᵈ. The lower ends of the combination levers are coupled, by combination links, 15, 15ª, to the cross heads, 16, 16ª, of the locomotive.

The combination levers, 5, 5ª, are coupled, by lap and lead rods, 7, 7ª, to floating levers, 8, 8ª, which are, in turn coupled to cross heads, 9, 9ª, which work on guides fixed to brackets, 10, 10ª, projecting rearwardly from the distribution valve chests, said cross heads being secured to the stems, 12, 12ª, of the distribution valves. Blocks or dies, 13, are fitted in the slots of the links, 6, 6ª, and are coupled, by pins, 13ª, to radius bars, 14, 14ª, the opposite ends of which are coupled to the floating levers, 8, 8ª. The relative dispositions of the lap and lead levers, radius bars, and floating levers, differ according as inside admission or outside admission distribution valves are to be actuated. Fig. 1 shows the disposition proper for the operation of inside admission valves, the lap and lead lever being connected to the upper end of the floating lever, the valve stem to the lower end, and the radius bar intermediate of the lap and lead lever and valve stem connections. As shown in Fig. 2, these members are disposed for the operation of outside admission valves, the valve stem being, in this case, coupled to the upper end of the floating lever, the lap and lead lever to the lower end, and the radius bar intermediate.

A reverse shaft, 17, is journaled in bearings supported in any convenient manner on the frame members, in rear of the rocker shafts, 4, 4ª, said reverse shaft carrying an upwardly extending reverse arm, 18, adapted for connection to a reversing mechanism of any suitable and preferred construction, and a downwardly extending arm, 18ª. The upper arm, 18, of the reverse shaft, is coupled by a link, 19, to the upper arm of a bell crank lifting lever, 20, which is journaled on a hub fixed to the link, 6ª, and rock shaft, 4ª, concentrically with said rock shaft, and the lower arm of the bell crank lever, 20, is coupled, pivotally, to a block, 21, fitted to slide in a straight slot, 22, formed in the radius bar, 14, and extending at a slight angle to the middle longitudinal plane thereof. The lower arm, 18ª, of the reverse shaft, is coupled by a link, 19ª, to the upper arm of a bell crank lifting lever, 20ª, which is journaled on a hub fixed to the link, 6, and rock shaft, 4, concentrically with said rock shaft, and the lower arm of the bell crank lever, 20ª, is coupled adjustably to a block, 21ª, fitted to slide in a straight slot, 22ª, formed in the radius bar, 14ª, and extending at a slight angle to the middle longitudinal plane thereof. Oil recesses or pockets, 22ᵇ, are formed in the radius bars, above the slots, 22, 22ª. In order to correct errors in design and shop errors, as for instance, difference in length between the cut offs on opposite sides, the link, 19ª, is connected to the lower arm, 18ª, of the reverse shaft, through the intermediation of a block, 18ᵇ, on which said link is pivoted, and which is adjustable in a longitudinal slot in the arm by means of a stud, 18ᶜ, and nuts, 18ᵈ, screwed upon the stud, so as to vary, as desired, the distance of the link coupling pin from the axis of the reverse shaft.

By connecting the radius bars with the reverse shaft on opposite sides of its axial line, as above described, the radius bars are caused to work adjacent to opposite ends of the links on opposite sides of the locomotive, that is to say, when the connection of the right hand radius bar is at or near the top of the slot of the right hand link, the connection of the left hand radius bar is correspondingly at or near the bottom of the slot of the left hand link, and vice versa. One motion consequently balances the other and no counterbalance spring is required. The advantages of this construction, in providing a quiet and easily handled reverse lever, will be apparent to those familiar with locomotive operation, as the reverse levers of the present large engines are so dangerous to handle that screw and power reversing gears have become almost a necessity and are being very generally applied. While these may, of course, be applied, if desired, in connection with my improved valve gear, their application is in no degree essential.

In valve gears of ordinary constructions, errors in the valve movements are induced by the angularity of the main rod, due to the fact that while the crank pin may be correctly quartered on the driving wheel, the pin does not occupy correctly quartering positions for the four dead centers. The valve is thereby caused to move farther from its central position in one direction than it does in the other, and the greater travel is toward one end of the cylinder in forward gear and toward the opposite end in backward gear. To eliminate this objection and insure equal link swing and symmetrical lap and lead movement, the slots in the radius bars which engage the blocks to which the forwardly extending arms of the bell crank levers are connected, are, as before described, inclined at a slight angle to the longitudinal middle planes of the radius bars, the result of which is to cause the link blocks to move farther from the center of the link in one direction than in the other, the main rod errors being thereby corrected with approximate accuracy. The relation of the slotted radius bars to the blocks fitting in the slots, and the connected reverse arms, is such that the weight of the radius bars is supported by said blocks, the wear being mainly between the tops of the blocks and the adjoining faces of the slots. These surfaces are in close working contact and by providing oil pockets in the radius bars, above the slots, oil, which is fed down only as used, will not run to waste.

In setting the distribution valve of each cylinder, when actuated by the valve gear hereinbefore set forth, the cross head is placed at one extremity of its stroke, and the link moved at a right angle to the radius bar, so that the reverse lever can be swung from one extreme position to the other without moving the valve. The key way in the transverse rock shaft is then located for the reception of the key by which the combination lever is secured thereto, and when the key is driven to a tight bearing, the valve will be properly set.

A leading novel and characteristic feature of my invention consists in mounting a lap and lead lever, a link, and a reversing arm, upon a rock shaft which constitutes a common fulcrum for these movable members. This construction is of substantial practical advantage, both in the matter of simplification and in insuring regularity of valve events, by automatically insuring uniform valve movement in all cases, for the reason that it entirely eliminates liability to error in properly locating the reverse shaft, which is one of the most serious sources of difficulty with the ordinary Walschaert valve gear.

I claim as my invention and desire to secure by Letters Patent:—

1. In a valve gear for double cylinder engines, the combination of a rock shaft extending transversely to the cylinders, an operating lever fixed on one end thereof, a segmental link fixed on the opposite end thereof, means for actuating the operating lever by movements of the piston of one of the cylinders, and means for transmitting movement from the link to the distribution valve of the opposite cylinder.

2. In a valve gear for double cylinder engines, the combination of a rock shaft extending transversely to the cylinders, means for oscillating said shaft, and a lap and lead lever, a link, and a reversing arm, all fulcrumed on said shaft.

3. In a valve gear for double cylinder engines, the combination of two parallel rock shafts extending transversely to the cylinders, means for independently oscillating said shafts, links fulcrumed on said shafts, and means for transmitting movement from each of said links to the distribution valve of the opposite cylinder.

4. In a valve gear, the combination of a lap and lead lever oscillating about a fulcrum, a distribution valve stem, a cross head secured thereto, a fixed guide for said cross head, and a floating lever coupled to said cross head and to the lap and lead lever.

5. In a valve gear, the combination of a lifting arm, a block pivotally connected thereto, a link fulcrumed concentrically with the lifting arm, and a radius bar coupled to said link and longitudinally slotted to slide on said block.

6. In a valve gear for double cylinder engines, the combination of a reverse shaft, two bell crank lifting levers, located one in advance of the other, connections whereby said bell crank levers are simultaneously oscillated in opposite directions by the reverse shaft, and radius bars, each coupled to one of the bell crank levers.

7. In a valve gear for double cylinder engines, the combination of a reverse shaft, two bell crank lifting levers located one in advance of the other, connections coupling said bell crank levers to the reverse shaft, above and below its fulcrum respectively, and radius bars, each coupled to one of the bell crank levers.

8. In a valve gear, the combination of a reverse shaft, an arm thereon, a bell crank lifting lever, a valve actuating member coupled to said lever, a link coupling said lever to the reverse shaft arm, and means for varying the distance between the connection of said link to the reverse shaft arm and the axis of the reverse shaft.

9. In a valve gear, the combination of a reverse shaft, a longitudinal slotted arm thereon, a bell crank lifting lever, a valve actuating member coupled to said lever, a block fitting the slot of the reverse shaft arm, a stud connected to said block, adjusting nuts engaging said stud, and a link coupled to the lifting lever and to said block.

10. In a valve gear, the combination of a single frame cross tie support, and valve actuating members carried by said support and having connections only to a cross head, a distribution valve stem, and a reversing device.

11. In a valve gear for double cylinder engines, the combination of two parallel rock shafts extending transversely to the cylinders, operating levers fixed on the opposite ends, respectively, of said rock shafts, links, each coupling one of said levers to the cross head of the engine on the side on which it is located, segmental links of different radii respectively, fixed on the ends of the rock shafts opposite those on which the operating levers are fixed, floating levers coupled to the distribution valve stems of the cylinders, lap and lead levers coupled to the operating levers and to the floating levers, radius bars coupled to the segmental links and to the floating levers, bell crank lifting levers, each coupled to one of the radius bars, a reverse shaft, and links coupling the bell crank lifting levers to the reverse shaft, on opposite sides, respectively of its axial line.

OTIS W. YOUNG.

Witnesses:
E. I. SCHAUBER,
WILL W. FAMBLY.